Oct. 29, 1940.  E. REED  2,219,493
APPARATUS FOR WELDING THIN SILICON STEEL AND THE LIKE
Filed June 6, 1938  6 Sheets-Sheet 1
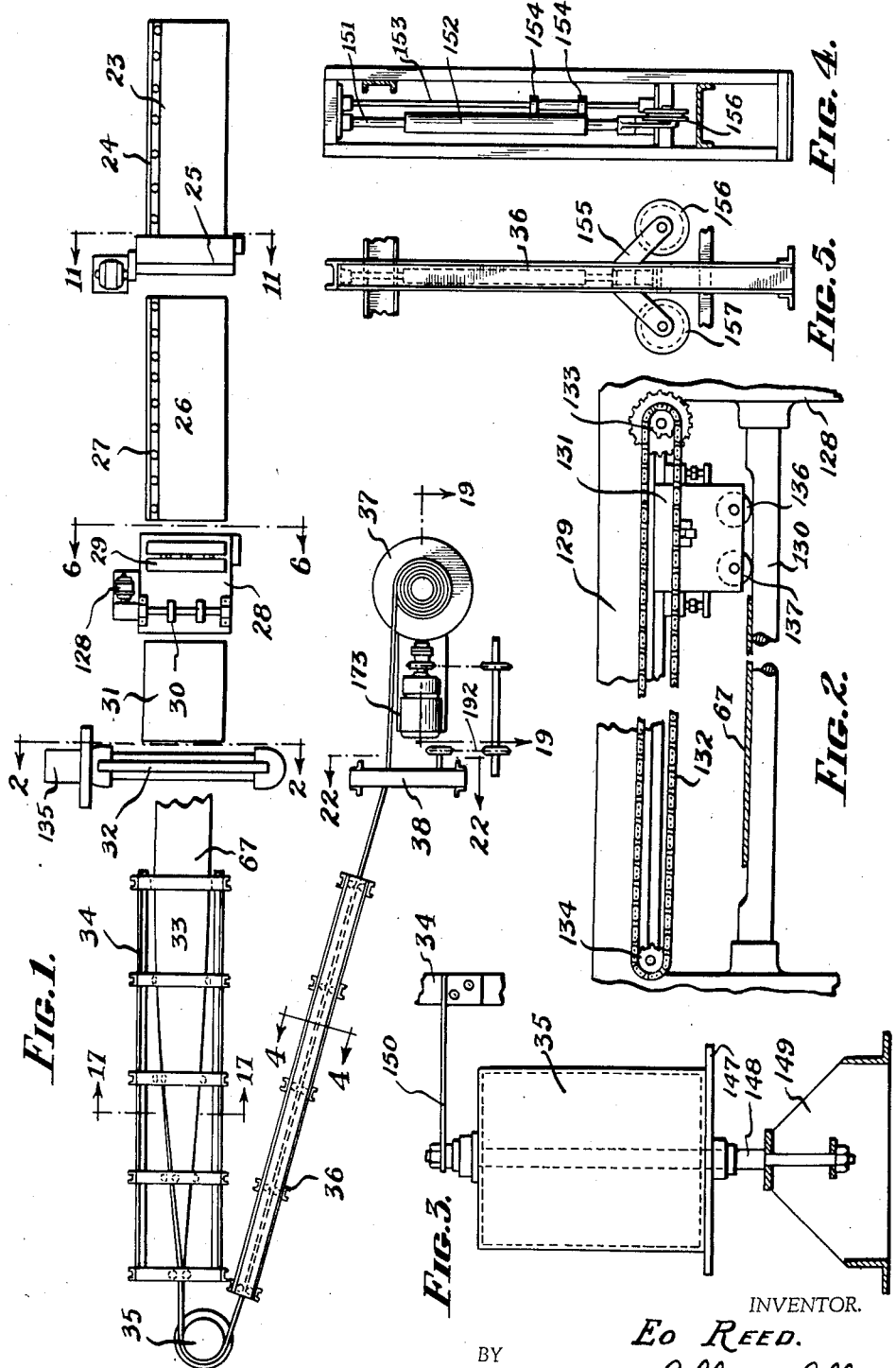
INVENTOR.
Eo Reed.
BY Allen & Allen
ATTORNEYS.

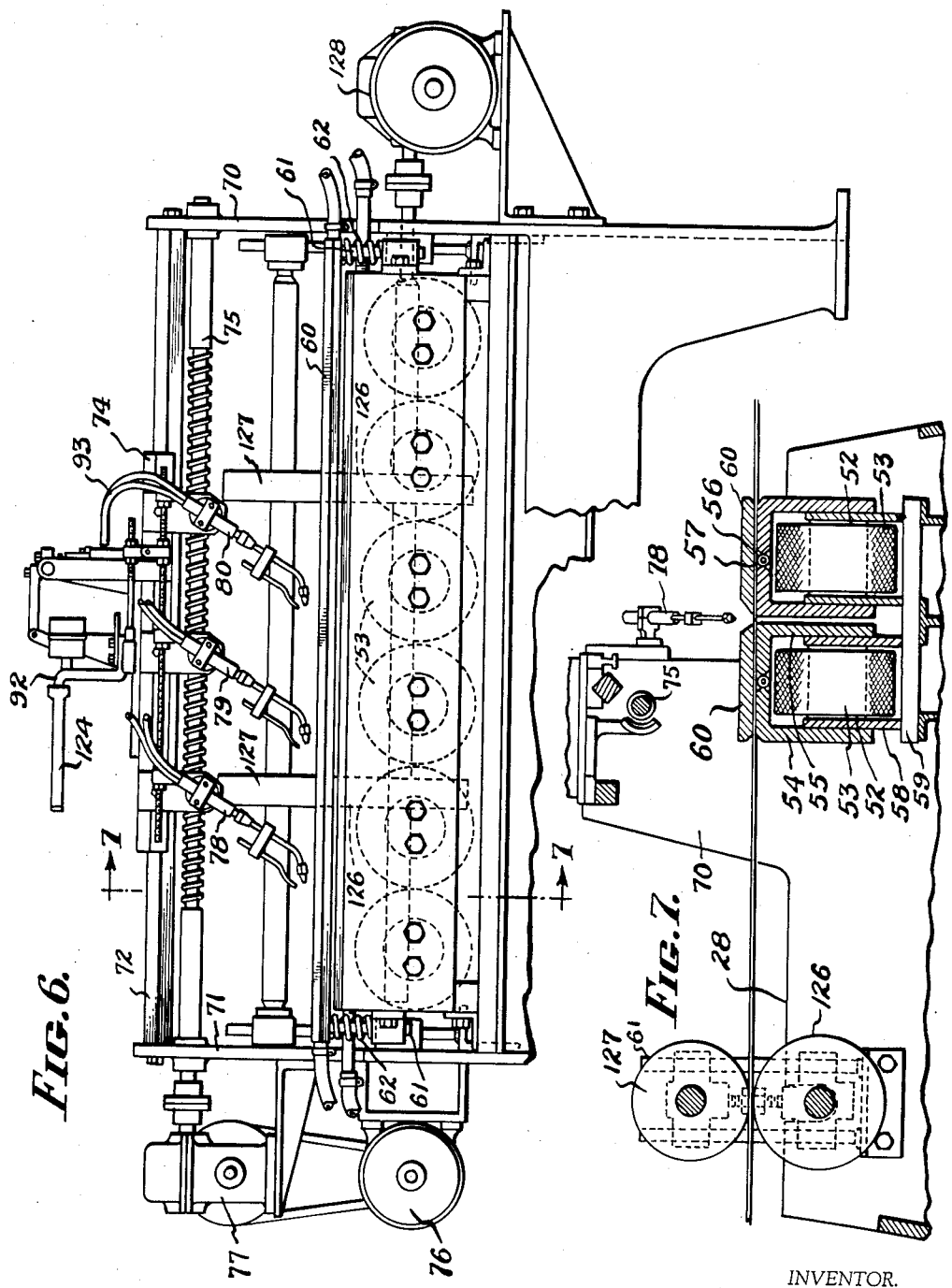

Oct. 29, 1940.                  E. REED                    2,219,493
        APPARATUS FOR WELDING THIN SILICON STEEL AND THE LIKE
                Filed June 6, 1938           6 Sheets-Sheet 3
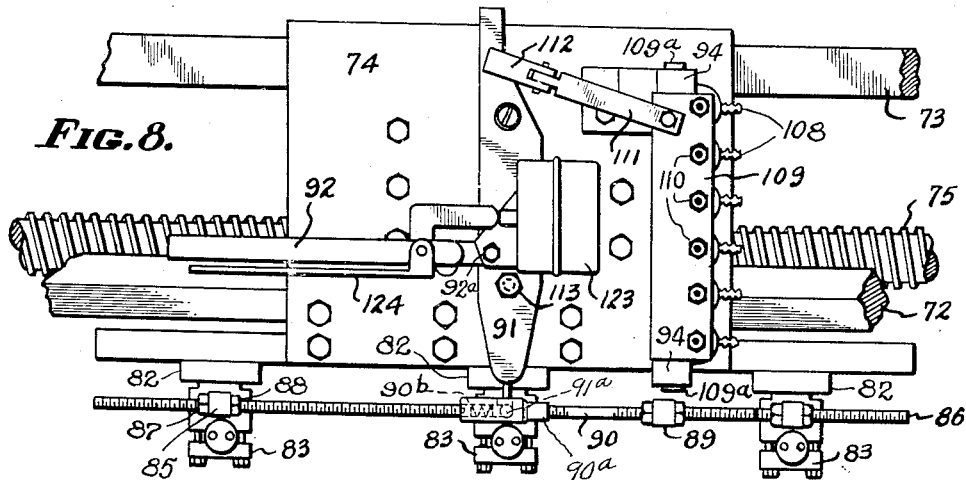
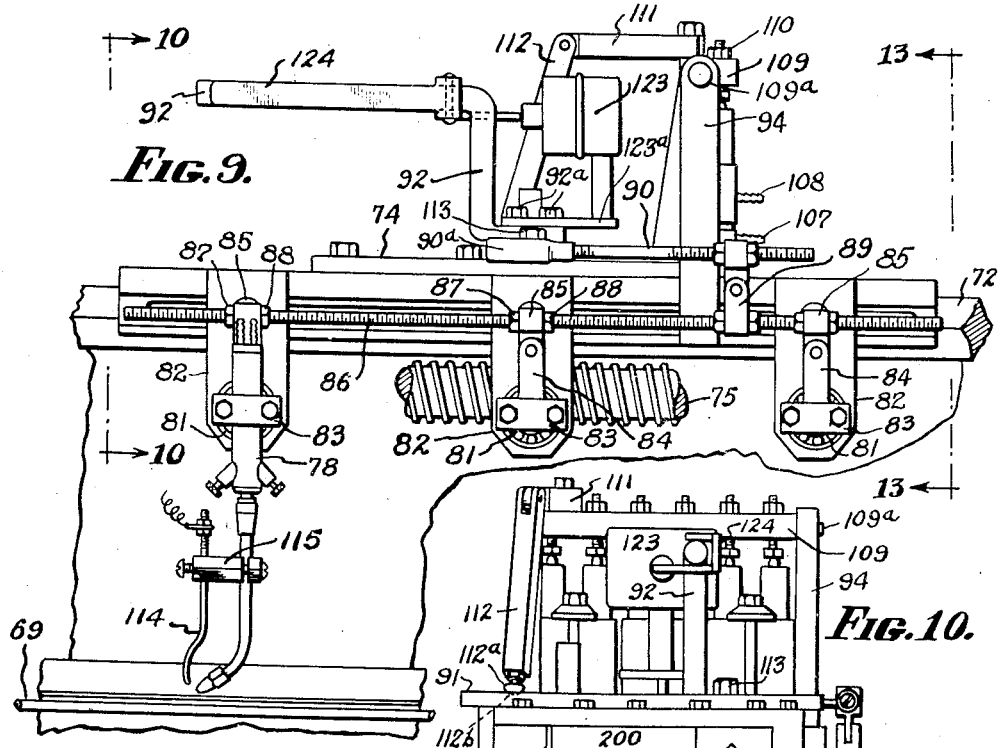
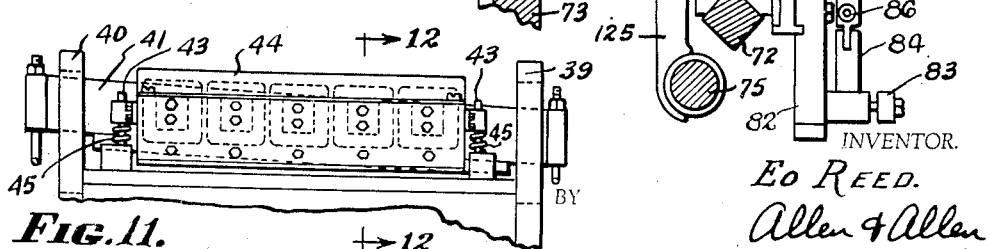
INVENTOR.
Ed Reed.
BY Allen & Allen
ATTORNEYS.

Oct. 29, 1940.　　　　　　　　E. REED　　　　　　　　2,219,493
APPARATUS FOR WELDING THIN SILICON STEEL AND THE LIKE
Filed June 6, 1938　　　　　　　6 Sheets-Sheet 4
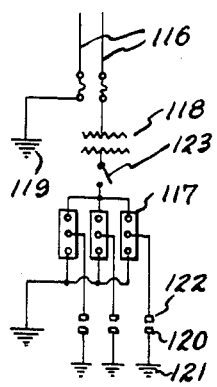
FIG. 15.
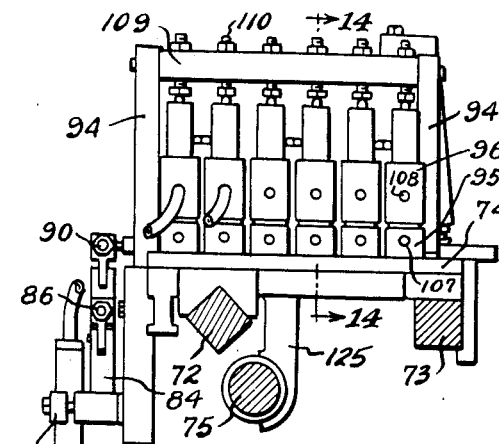
FIG. 13.
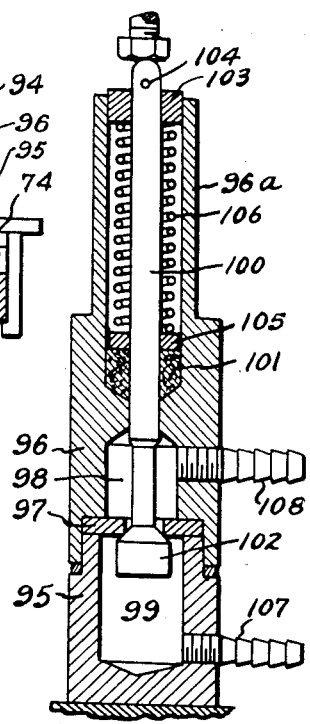
FIG. 14.
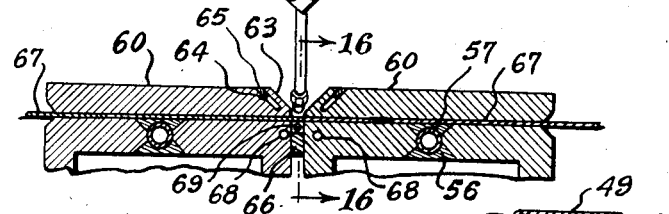
FIG. 12.
FIG. 16.
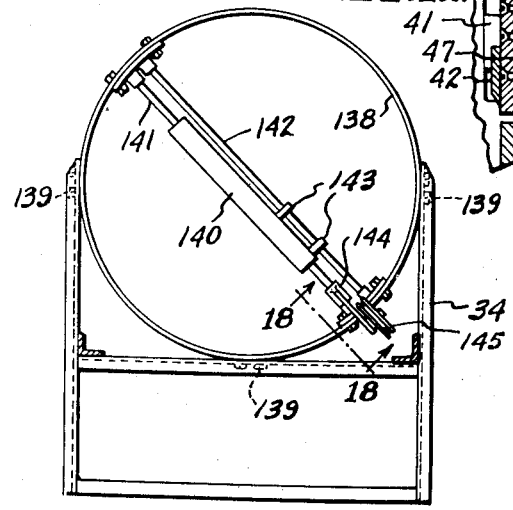
FIG. 17.
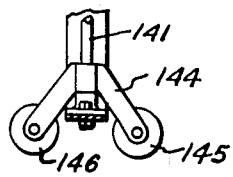
FIG. 18.
INVENTOR.
Eo Reed.
Allen & Allen
BY
ATTORNEYS.

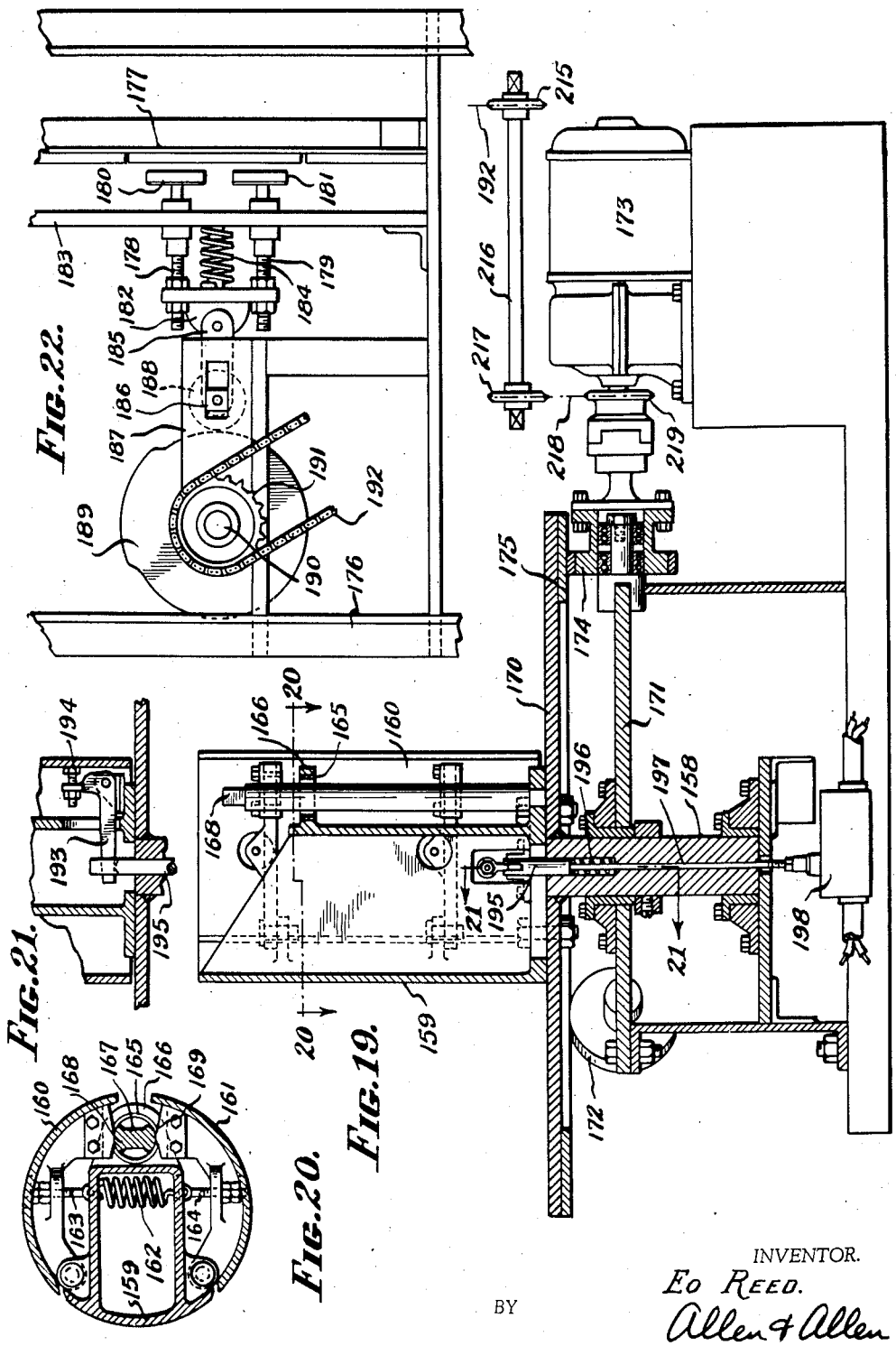

Oct. 29, 1940.　　　　　E. REED　　　　2,219,493
APPARATUS FOR WELDING THIN SILICON STEEL AND THE LIKE
Filed June 6, 1938　　　6 Sheets-Sheet 6
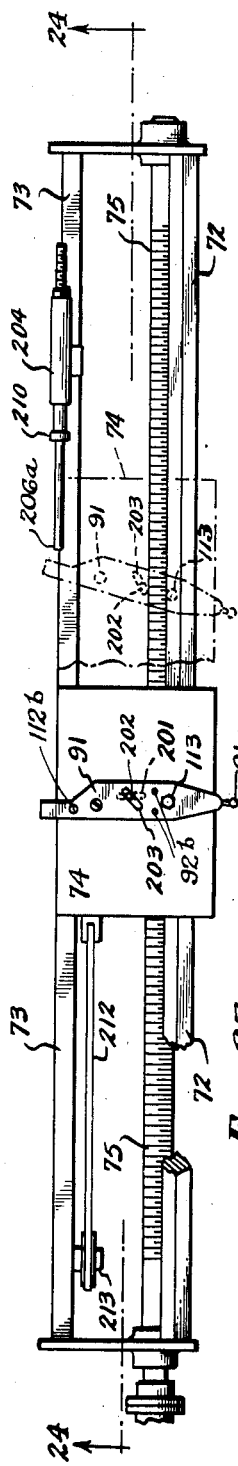
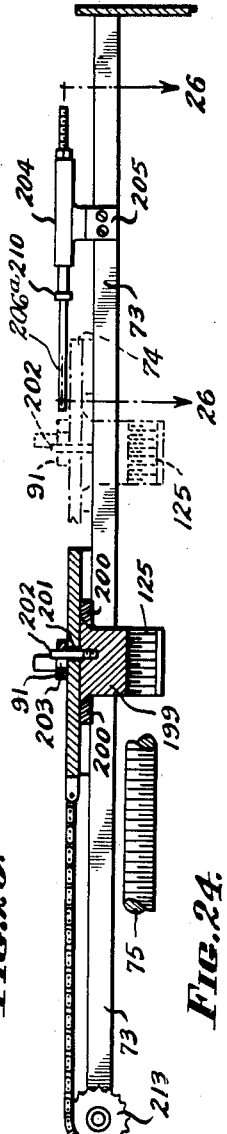
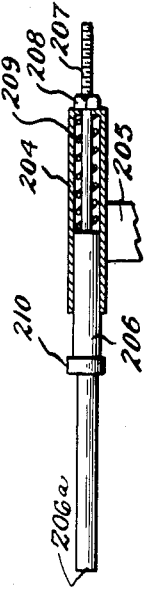
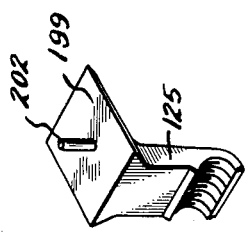
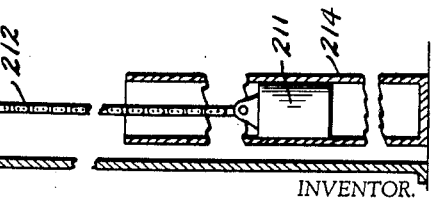
INVENTOR.
Eo Reed.
BY Allen & Allen
ATTORNEYS.

Patented Oct. 29, 1940

2,219,493

UNITED STATES PATENT OFFICE 2,219,493

APPARATUS FOR WELDING THIN SILICON STEEL AND THE LIKE

Eo Reed, Zanesville, Ohio, assignor to The American Rolling Mill Company, Middletown, Ohio, a corporation of Ohio Application June 6, 1938, Serial No. 212,039

1 Claim. (Cl. 113—59)

My invention has gone into commercial practice in the production of large coils of thin silicon steel sheet material, which coils are used by way of example, for the substantially continuous feeding of stamping machines in the production of transformer core stampings. The continuous feeding of such machines is a matter of considerable commercial economy both in the operation of the machine and in the elimination of waste material as will be clear. I shall describe my invention in connection with the formation of such coils of thin silicon steel sheet material, it being understood that the principles of my invention are applicable to other materials.

My invention is related to and constitutes an improvement upon what is set forth in certain copending applications as follows: Serial No. 132,824, Fay and Reed, Welding process and apparatus for thin sheet metal, filed March 24, 1937; Serial No. 132,826, Asbury and Reed, Process and apparatus for coiling strip material, filed March 24, 1937, and Serial No. 132,825, Fay and Reed, Process and apparatus for securing accurately butted sheet ends for welding, filed March 24, 1937. In the present invention a number of the principles set forth and claimed in these copending cases are employed.

The fundamental object of my invention is the provision of a simple, accurate, commercially successful apparatus for the butt welding of thin sheet metal materials so as to form greater effective lengths thereof, by means of welds which are formed by interfusion of the metal of the butted sheet edges, and which welds are not substantially thicker, if at all, than the gauge of the sheet members themselves.

The ancillary objects of my invention will be set forth hereinafter or will be apparent to one skilled in the art upon reading these specifications; and I accomplish these several objects by that certain construction and arrangement of parts of which I shall now describe an exemplary embodiment. Reference is made to the drawings wherein:

Figure 1 is a plan view of the general assembly of apparatus for the purpose described.

Fig. 2 is an elevational view of a rolling mechanisms employed in connection therewith, the view being taken along the lines 2—2 of Fig. 1.

Fig. 3 is an elevational view of an end roll mechanism.

Fig. 4 is a view of a tilting roller mechanism taken along the lines 4—4 of Fig. 1.

Fig. 5 is a side elevational view of the apparatus of Fig. 4.

Fig. 6 is an elevation view of a welding apparatus taken long the lines 6—6 of Fig. 1.

Fig. 7 is a longitudinal section through this apparatus taken along the lines 7—7 of Fig. 6.

Fig. 8 is a top plan view of a portion of the welding apparatus.

Fig. 9 is an elevational view of the same apparatus.

Fig. 10 is an elevational view of the same apparatus taken along the lines 10—10 of Fig. 9.

Fig. 11 is an elevational view of a shear and clamping mechanism taken along the lines 11—11 of Fig. 1.

Fig. 12 is a sectional view thereof taken along the lines 12—12 of Fig. 11.

Fig. 13 is a side elevational view of the apparatus of Figs. 8, 9, and 10 taken along the lines 13—13 of Fig. 9.

Fig. 14 is a sectional view of a valve mechanism embodied in the apparatus of Figs. 8, 9, 10 and 13, and taken along the lines 14—14 of Fig. 13.

Fig. 15 is a wiring diagram for the igniting mechanism.

Fig. 16 is a fragmentary view partially in elevation and partially in section, showing the relationship of the torch to the work, and taken along the lines 16—16 of Fig. 13.

Fig. 17 is an elevational view of a tilting roller assembly taken along the lines 17—17 of Fig. 1.

Fig. 18 is a fragmentary view of a sheet edge supporting mechanism taken along the lines 18—18 of Fig. 17.

Fig. 19 is a vertical sectional view of a coiler mechanism taken along the lines 19—19 of Fig. 1.

Fig. 20 is a horizontal sectional view of the coiler drum taken along the lines 20—20 of Fig. 19.

Fig. 21 is a detail section taken along the lines 21—21 of Fig. 19.

Fig. 22 is an elevational view of a tightening mechanism taken along the lines 22—22 of Fig. 1.

Fig. 23 is a plan view of the frame and head of the welding machine with parts removed.

Fig. 24 is a vertical section taken along the lines 24—24 of Fig. 23.

Fig. 25 is a perspective view of the half nut.

Fig. 26 is a sectional view, taken along the lines 26—26 of Fig. 24, showing a stop and turn-off mechanism.

In the practice of my invention, sheet or strip materials to be welded together are first placed on a table 23 having guide means 24 thereon.

With the sheet edge held against the guide means the end of each sheet is sheared by a mechanism indicated at 25, comprising a magnetic hold down which clamps the end of the sheet under a given force effective over a given area and a shear mechanism which accurately shears the sheet end square. After one end of the sheet is sheared the sheet is reversed on the table 23 and its other end sheared. By the procedure thus described, all ends of sheets to be joined by welding are sheared under identical conditions of clamping area and pressure. As set forth in the copending application of Fay and Reed, these sheets although quite thin, can be properly welded together if clamped during the welding under identical conditions of clamping and pressure, even though the sheets are characterized by considerable waviness and lack of flatness.

The sheets which have been sheared are transferred to a table 26, also preferably provided with a guide 27. The trailing end of the strip formed by welding rests upon a table 28 at a welding device 29. Here there are a pair of clamps, one for holding the edge of each of the sheets which are to be joined together, and the clamping area and pressure at this point are identical with the clamping area and pressure employed in shearing the sheets. On the table 26 the sheet to be joined to the trailing end of the already formed strip is brought against the guide 27 and into the clamping means. By the clamping means the sheet edges (in view of the shearing which has already been accomplished) are accurately butted and accurately held in butted relationship.

A feeding device 30 may assist in the movement of the strip over the table 28, over a table 31, and to a traveling rolling device 32 which rolls the welded seam soon after formation.

The strip of welded sheets is indicated at 33. It passes through a device 34 which turns it through 90 degrees so that it can be passed around a vertical reversing roll 35, and carried through guide means 36 to a coiler indicated at 37. This is a vertical coiler having a mandrel, and a flange upon which the coil rests. In accordance with the teachings of the Asbury and Reed application referred to above, the coiler drum is continuously driven during the coiling operation. Periodically, however, a retarding device indicated generally at 38 acts upon the strip to retard its movement, thereby tightening the coil. In this way (and so far as is known at present only in this way) can a tight coil be formed of thin material characterized by lack of flatness.

I will now proceed to a specific description of the individual machine elements, the combination of which has been hereinabove described.

By reference to Figs. 11 and 12, the details of an exemplary shearing apparatus will be seen. The machine embodies frame members 39 and 40 in which a knife frame 41 is slidably mounted. This frame carries a knife 42 and is driven by suitable motive means shown in Fig. 1. Resiliently mounted upon rods 43 on the shear bed is a magnetic clamping means indicated generally at 44. This is held up by springs 45 or other resilient means. The magnetic hold down or clamp comprises a plurality of core members 46 and pole piece members 47 and 48. A housing 49 may cover the coils 50 on the cores; and the bottom of the hold down may be bridged by a non-magnetic member 51. Different constructions of the magnetic clamping means may be employed; but an essential feature is the securing of a particular pressure effective over a particular area extending back from the edge of the sheet which can be matched at the welding device. The reasons why this is so have been made clear above.

The magnetic hold down means for the welding device are shown most clearly in section in Fig. 7. These again comprise interspaced core elements 52 bearing coils 53. Pole pieces 54 and 55 are provided, which in the particular instance approach each other above the coils and substantially along the center axis of the clamping means. The interspace between the pole pieces is filled as at 56 with non-magnetic material such as brass or bronze, and is centrally perforated as at 57 for the passage of a cooling fluid. By reason of the fact that in welding the trailing edge of the strip is to be joined to the leading edge of a sheet, two magnetic hold-down clamps are provided. These are similar in construction as shown. They are supported by suitable means 58 upon a bed 59 of the welding machine.

Cooperating with the magnetic structure just described are clamping plates 60 mounted (as shown in Fig. 6) on rods 61 and urged upwardly by means of springs 62. The members 60 are, of course, of magnetic material. The respective areas of the members 60 and the pole faces of the magnetic means will be the same as the effective area of the magnetic clamp on the shear for reasons which have already been made clear.

A detailed view in cross section of the clamping means is shown in Fig. 13. The forward edges of the members 60 are beveled as at 63, and are slotted near the beveled edges as at 64, the slot being plugged at the surface of the member by welding as at 65. This leaves a passageway near the edge of each member 60 for cooling fluid.

The clamping means are slightly interspaced as clearly shown in Fig. 13. Between them there may be placed a spacer bar 66. The sheet material 67 is butted as is shown, and firmly held by the clamps in exact relationship for welding. Additional passageways for coolant fluid may be formed as at 68 in the magnetic means. Above the spacer bar 66, I place, preferably, a tube 69 (also shown in Fig. 9) which tube is closed at one end and has a series of perforations in its upper surface. During the welding, a non-oxidizing gas, for example nitrogen, is thus maintained in the space immediately below the butted edges of the sheet 67. I find this to be of material assistance in the formation of welds in thin silicon steel. It prevents oxidation occurring on the underside of the weld, and also renders somewhat less critical the control of the flame applying means. For some types of work and for work with other metals, the use of a non-oxidizing gas will not be found necessary.

The welding is done by means of a torch having substantially a neutral flame.

The use of means beneath the weld for supplying from an external source a neutral gas make it unnecessary to cause the torch tips to ride on the work as was hitherto found desirable. This simplifies somewhat the mounting and control of the torch means and minimizes wear.

A number of torches may be used simultaneously at interspaced moving positions to shorten the stroke of the machine and speed up the welding operation. In the exemplary embodiment, I have shown three torches.

As shown in the several figures, on end standards 70 and 71 we mount guide rails 72 and 73 for a head indicated generally at 74. A threaded shaft 75 for moving this head is journaled in the standards 70 and 71 and is arranged to be driven by a motor 76 through a gear box 77. The head bears torches 78, 79, 80 respectively mounted on swivel joints 81 by means of clamps, as most clearly shown in Fig. 9. The swivel joints are mounted in ears 82 on the head. Attached to each clamp 83 there is an arm 84 pivoted to a member 85 which engages a threaded rod 86. Nuts 87 and 88 on each side of each member 85 permit adjustment of position along the rod 86. Linkage means 89 (also preferably adjustable on the rod 86) connect this rod through a link means 90 to a lever 91 pivoted at 113 on the welding head 74. The rod or link 90 is connected to the lever 91 by means of a ball and socket arrangement indicated at 90a, the lever 91 having an extending ball 91a and the link 90 having threaded thereto a socket 90b engaging the ball. An operating lever 92 is bolted to the lever 91 by cap screws 92a, which screws also engage a bracket 123a supporting switch 123. Thus it will be apparent that any movement of the handle 92 will result in rotation of lever 91 about its pivot 113 and it will also be apparent that the switch 123 will be carried along therewith, the three members 91, 92 and 123 moving as a unit about the pivot 113, but retaining their same relative positions. The torches are held in the clamps 83, and by means of the linkage mechanism connected to lever 91, may be varied from the position shown in Fig. 6 (where they are away from the work) to a position shown in Figs. 9 and 16, where the torches are in welding position.

The torches are connected by conduits 93 to a series of valves shown in Figs. 8, 9, 10, 13 and 14. These valves are arranged in a frame 94 on the head. Each valve consists of a two-part body 95, 96 having a valve seat member 97 between them, so as to provide upper and lower chambers 98 and 99. The upper end of the member 96 forms a tubular extension 96a through which a valve rod 100 passes, there being a packing gland 101 near the upper end of the chamber 98. The valve stem 100 bears a valve head 102 co-operating with the valve seat 97. Near its upper end the valve rod carries a disc 103 held in place by a pin 104; and between the disc and the upper end of the washer 105 of the gland there is a coil spring 106 which acts normally to keep the valve closed. The chambers 98 and 99 are provided with two connectors 107 and 108. For each torch there will be two of the valves shown in Fig. 14, one for gas and one for air, as will be understood. The torches will be connected respectively, by the tubing 93 to the valve chambers 98 while the chambers 99 will be connected by flexible tubing to cylinders of gas and sources of air or oxygen respectively.

The valves are arranged in the frame so as to be acted upon concurrently by a member 109 in the form of an elongated bell crank pivoted at 109a to the frame members 94. This bell crank has set screw means 110 located above each of the valve rods 100 of the several valves and adjustable so as to bring about the concurrent opening and closing of the several valves. The bell crank member 109 bears a rigid arm 111 (as shown in Figs. 8, 9 and 10) which arm is pivoted to a push rod 112 which engages the pivoted lever 91 on the head. The engagement of push rod 112 with lever 91 is effected by a round head screw 112a, adjustably fixed to rod 112 and resting in an indentation 112b formed in lever 91, the relationship of the two members being retained by back pressure of the springs 106 in the valves. The lever 91 as has been explained is moved by the operating hand lever 92. As shown in the drawings the effective length of the push rod 112 is adjusted so that the rod normally occupies an inclined position. Thus movement of the lever 91 about its pivot 113 will vary the degree of inclination of the rod and raise or lower the arm 111 which arm, acting through bell crank 109 as previously explained, opens or closes the valves. The member 92 thus serves the simultaneous purpose of swinging the torches down into position and turning on the gas.

Each torch is provided with an ignition electrode 114 held in place thereon by an insulating clamp 115. The torches are ignited by a spark jumping between this electrode and the torch tip. A circuit for this purpose is shown in Fig. 15. Power leads 116 feed one or more spark coils 117 through an impedance 118. One of the power lines is grounded as at 119, and the torch tips 120 (represented as contacts in this figure) are likewise grounded as at 121. The electrodes 114 are also shown here as contacts 122. A switch 123 is provided. When this switch is closed a spark will jump between the contacts 122 and 120. The switch 123 is indicated by the same numeral in Figs. 8 and 9. It is mounted on a bracket on the head and is arranged to be actuated by an arm 124 pivoted upon the operating lever 92. When the arm 124 is pressed against the lever, the switch will be actuated and a spark caused to jump, as will be clear. The actuation of the switch by a separate arm 124 permits the operator to throw the switch as many times as may be necessary to ignite the torches.

In operation, the torches being in the position shown in Fig. 6 and to the left of the apparatus, the operating lever 92 is thrown. This brings the torches down to operating position and turns on the gas. The gas is ignited by manipulation of the arm 124. The throwing of the operating lever 92 operates a half nut 125 so as to cause this half nut to engage the threaded shaft 75. This shaft being driven by the motor 76 causes the entire head to move to the right in Fig. 6, thereby progressively effecting a weld between the sheet metal pieces 67. At the conclusion of the welding stroke the torches are raised and the gas simultaneously cut off, whereupon the carriage is traversed back to the starting position. The table 28 of the welding device may be provided with feed rolls 126 and 127 driven by a suitable motor 128 to assist in the removal and/or positioning of the welded material.

I shall now describe the mechanism by which these operations are effected. The half nut 125 (as most clearly shown in Figures 24 and 25) is formed or cast with a dove-tailed or rabbetted block 199 which slides in ways 200 on the head 74. The head has a transverse slot 201 through which a pin 202 on the block 199 can move as the block slides. This pin is long enough to engage in a diagonal slot 203 in the lever 91. Thus as the lever 91 is swung in a clockwise direction about the pivot 113, the head 119 and attached half nut will be forced downwardly as seen in broken lines in Fig. 23 or toward the observer as seen in Fig. 24, thereby causing the half nut to come into engagement with the threaded shaft 75. This shaft, being driven, the head and associated parts will, under these circumstances, be traversed to the right in these figures.

In Fig. 23 certain parts already described have been removed to clarify operation of the carriage return mechanism. These removed parts include the operating lever 92 with switch 123, both of which are normally fixed to lever 91 by screws which enter the threaded holes 92b; the linkage for raising and lowering the torches which linkage is, in other figures of the drawings, connected to the ball 91a by a socket member 90a; and the valve mechanism controlled by a push rod which rests in the indentation 112b.

When the lever 91 is swung in a counter clockwise direction, the half nut will be disengaged from the shaft and the traverse of the head will be stopped. It has already been explained how the lever 91 controls both the position of the torches and the supply of gas and air thereto. I provide means at the end of the traverse of the head automatically to actuate the lever 91. These means comprise the cylinder 204 which may be mounted on the rail 73 or elsewhere by a bracket 205. The mounting of the cylinder may be made adjustable if desired. A piston 206 is slidably mounted in the cylinder, and is furnished with a guide rod 207 which extends through a perforation in the cylinder end and is provided with a limiting nut 208. A compression spring 209 engages between the end of the piston 206 and the cylinder end, to keep the piston urged to the left in the figures, to the limit established by the nut. The cylinder is so placed that the end 206a of the piston will pass over the head 74 during the latter part of the traverse thereof until it strikes the projecting end of the lever 91 and swings it in a counter clockwise direction. The position of the members 74, 91, and 206a, just before this action occurs, is shown in broken lines in Figs. 23 and 24. This, as has been explained, turns off the gas and air, swings up the torches, and disconnects the head 74 from the threaded shaft 75 so as to stop its traverse. The piston may be provided with a shoulder member 210 adapted to contact the edge of the head 74 and to bring the head to rest without excessive jar against the compression of the spring 209.

For returning the head, I may employ a weight 211 connected to the head by means of a chain or cable 212 which passes over a sheave 213. The weight may be caused to slide in a cylinder 214 in such a way that a dash-pot effect is produced cushioning the return traverse of the head. It will be understood from this description that after the operator throws the lever 92 and ignites the torches, the remainder of the operations of the head and associated parts become automatic.

The welded material next goes, as has been explained, to a rolling device which is illustrated in Fig. 2. In a frame 128 comprising a heavy upper beam and a lower beam or anvil 130, a head 131 is slidably mounted. This head is arranged to be driven by a chain 132 passing over sprockets 133 and 134. The sprocket 133 may be driven by a motor 135. Two rollers 136 and 137 are journaled in the head 131. These rollers act to roll a weld in the strip material 67 positioned on the anvil 130, the apparatus preferably being so adjusted that during the traverse in one direction one of the rollers is effective, the other being effective during the opposite traverse.

The material then passes to a frame 34 in which are mounted tilting rollers. These rollers are illustrated in Fig. 12. A hoop 138 is mounted in the frame 34 at a desired position by means of bolts 139. A roll 140 on which the strip material rests is journaled on a shaft 141 mounted in the hoop. A second shaft 142 parallel to the first may bear either a large roll or small interspaced rolls 143. The strip material goes between the roll 140 and the roll or rollers on the opposite side. Supported upon the shaft 141 at its lower end is a yoke 144 bearing interspaced sheaves 145 and 146 which are grooved, as clearly shown in Fig. 17. The edge of the strip material rides in the grooves of these sheaves so as to maintain its position. A series of the mechanisms shown in Fig. 17 make up the tilting device indicated generally at 34 in Fig. 1, and the action of the several rolls and supports in this mechanism is to tilt the strip 67 through substantially 90 degrees so that it can be led about a reversing roll 35. This roll, as shown in Fig. 3, has a flange 147. It is mounted upon a shaft 148 suitably journaled in a base 149. The shaft may be guided above by an arm 150 affixed to the framework 34 or to some other suitable support. Preferably the shaft 148 is stationary, and the roll 135 is journaled thereon.

On its way from the reversing roll 35 the strip 67 passes through the device indicated generally in Fig. 1 at 36. This is a framework containing the supporting rolls illustrated in Figs. 4 and 5. In the frame 36 a shaft 151 is mounted. This shaft bears a roll 152. A parallel shaft 153 either bears a similar roll or small rollers 154. Again I mount a yoke 155 on the shaft 151. This yoke carries supporting sheaves 156 and 157 for the edges of the sheet.

The strip material is coiled by coiler means shown most clearly in Figs. 19 to 22. Here in a suitable base I journal a shaft 158. This shaft bears an expansible mandrel having a body 159 and segmental arms 160 and 161 pivoted to the body. These arms are urged toward each other by springs 162 on eye bolts or the like 163 and 164 attached to the arms. A cam shaft 165 is journaled in ears 166 on the body 159. This cam shaft bears cams 167. It also has a squared end 168 whereby it may be turned with a wrench, to expand or contract the mandrel, as will be clear. The cam members 167 bear against abutments 168 and 169 respectively on the arms 160 and 161. At the bottom of the mandrel body 159 I provide a flange 170. On a sub-base member 171 I mount supporting rolls 172 for the flange. A motor 173 drives a friction member 174 rotatably mounted upon a sub-base 171 and contacting a friction annulus 175 on the flange 170.

In a frame 176 near the coiler device, or forming part of it, I provide an anvil 177 over which the sheet passes. Rods 178 and 179 bear brake shoes 180 and 181 which bear against the opposite side of the strip. These rods are connected by a yoke 182 and are journaled in a beam member 183. Between the beam and the yoke I provide a spring 184 to return the brake shoes. The yoke 182 is connected by a link 185 with a member 186 journaled in brackets 187. This member bears a cam follower 188 which bears upon a cam 189 also journaled in the brackets 187 upon a suitable shaft 190. A sprocket 191 may be connected by a suitable chain 192 to a sprocket 215 on a stub shaft 216 having suitable bearings (not shown). A sprocket 217 on the stub shaft is in turn connected with a sprocket 219 on the shaft of the motor 173 by a chain 218. Through the action of the cam the brake shoes 180 and 181 will periodically be brought forcibly against the strip material on the anvil 177 so as to restrain its movement. The movement of the coiler device of Fig. 19, however, is constant. This results in a periodic tightening of the convolutions of the coil being formed thereon. It is not possible to wind a tight coil of silicon steel which is not characterized by flatness, by merely applying constant tension or by winding loosely and afterward attempting to tension the whole coil. In my machine, one or a very small number of convolutions are formed loosely on the coil, and then these concolutions are tightened by the means just described before additional convolutions are wound, the action recurring regularly in timed sequence with the winding of the coil.

As a safety measure I pivot a bell crank 193 to the body 159. One end of this bell crank has a bearing by means of an adjustable nut 194 against one of the arms 160 and 161. The other end of the bell crank is connected to a plunger 195. This construction is shown in Figs. 19 and 21. The plunger operates in a bore in the shaft 158 and a coiled spring 196 may be employed to urge the plunger upwardly. A rod 197 is attached to the plunger, extends through the shaft, and is connected with a cutout shaft 198 in the circuit of the motor 173. This device makes it impossible to start the motor 173 unless the mandrel is in expanded condition. If anything happens to the coil on the mandrel which permits the mandrel to contract, this construction likewise will stop the motor.

Modification may be made in my invention without departing from the spirit of it.

Having thus described my invention what I claim as new and desire to secure by Letters Patent, is:

In a welding apparatus a frame, ways on said frame, a head slidably mounted on said ways, a threaded shaft extending across said frame and parallel to said ways, unidirectional motor means on said frame for rotating said shaft, a half nut movably mounted on said head and adapted to be brought into engagement with and disengagement from said headed shaft whereby said head may be driven uni-directionally and disconnected from said shaft, depending upon the position of said half nut, a torch pivotally mounted on said head, valve means for said torch also mounted on said head, an operating lever on said head and mechanical connections between said lever and said half nut whereby to move said half nut between said lever and said torch whereby to swing said torch about said pivot and between said lever and said valve means whereby to control the admission of gas to said torch, means at one end of said frame in the direction of movement of said head as driven by said threaded shaft, for effecting an automatic operation of said lever to swing up said torch, disconnect the gas supply therefrom, and disconnect the half nut from said threaded shaft, means comprising a weight and cable for returning the head when disconnected from said shaft to the opposite end of said frame automatically, and means of the character of a dash pot to bring said head to rest at said opposite end of said frame as so returned.

EO REED.